Figure 1:
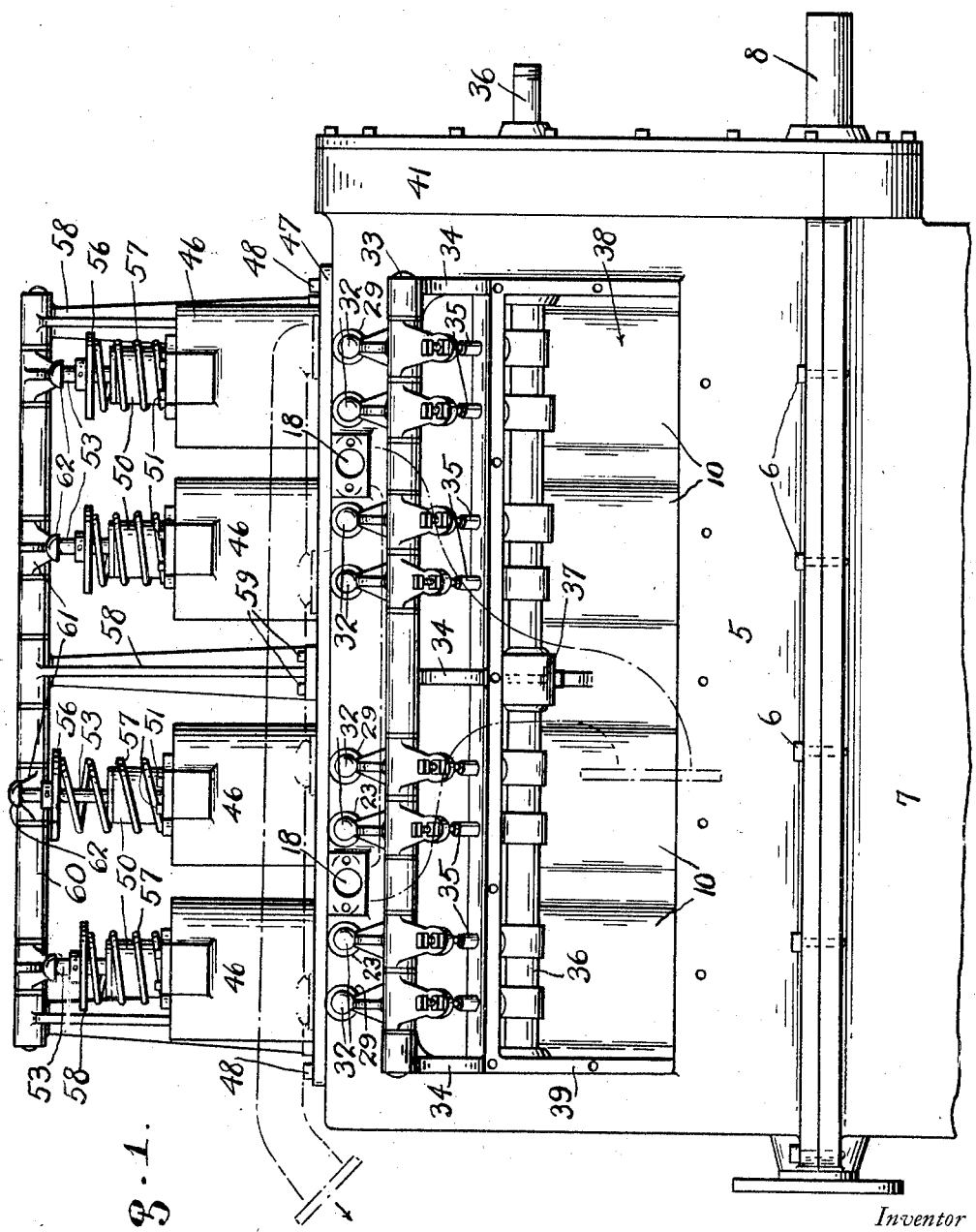

July 9, 1929.   R. H. McCOY   1,720,368
INTERNAL COMBUSTION ENGINE
Filed May 23, 1927   6 Sheets-Sheet 1

Inventor
R. H. McCoy
By Clarence A. O'Brien
Attorney

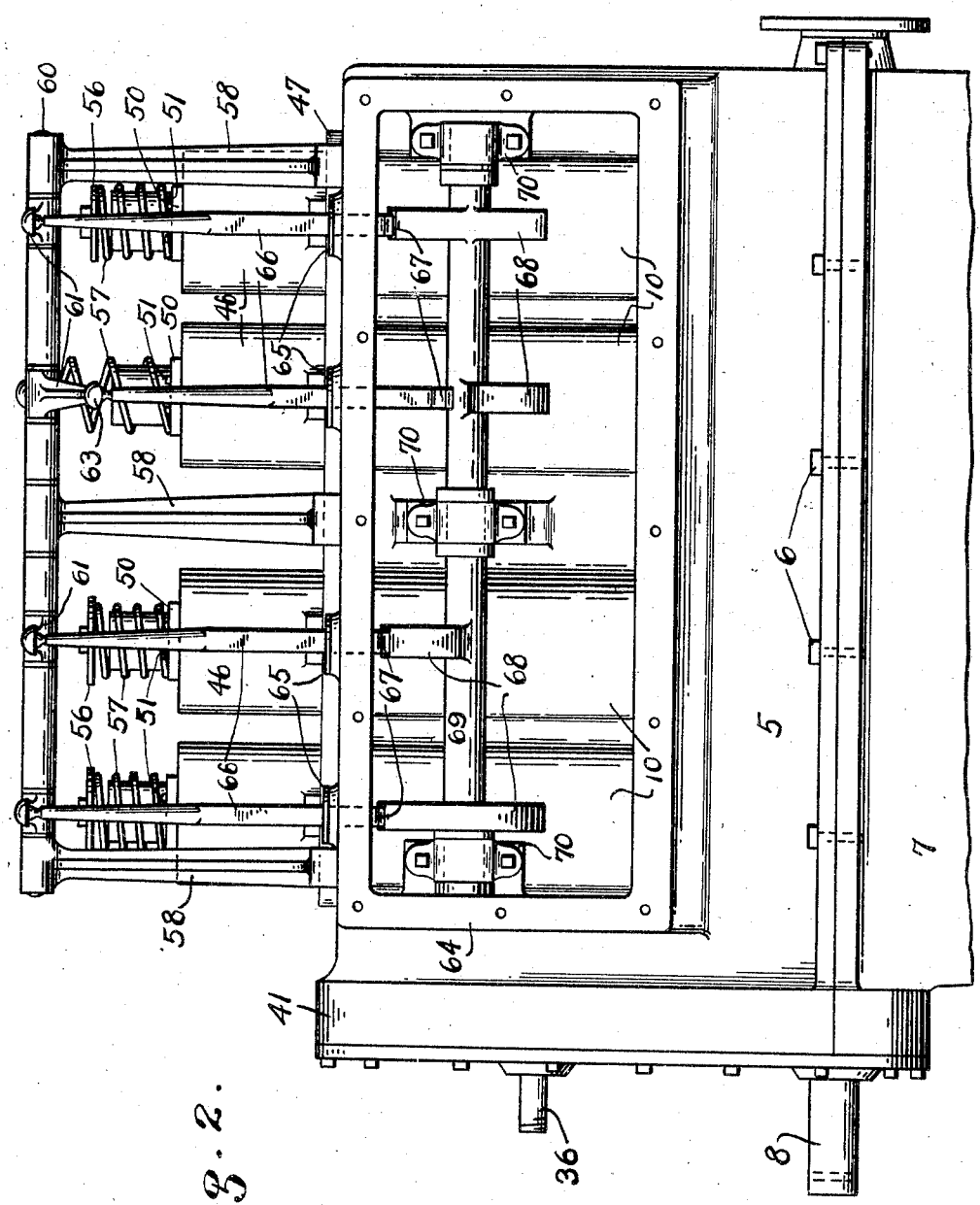

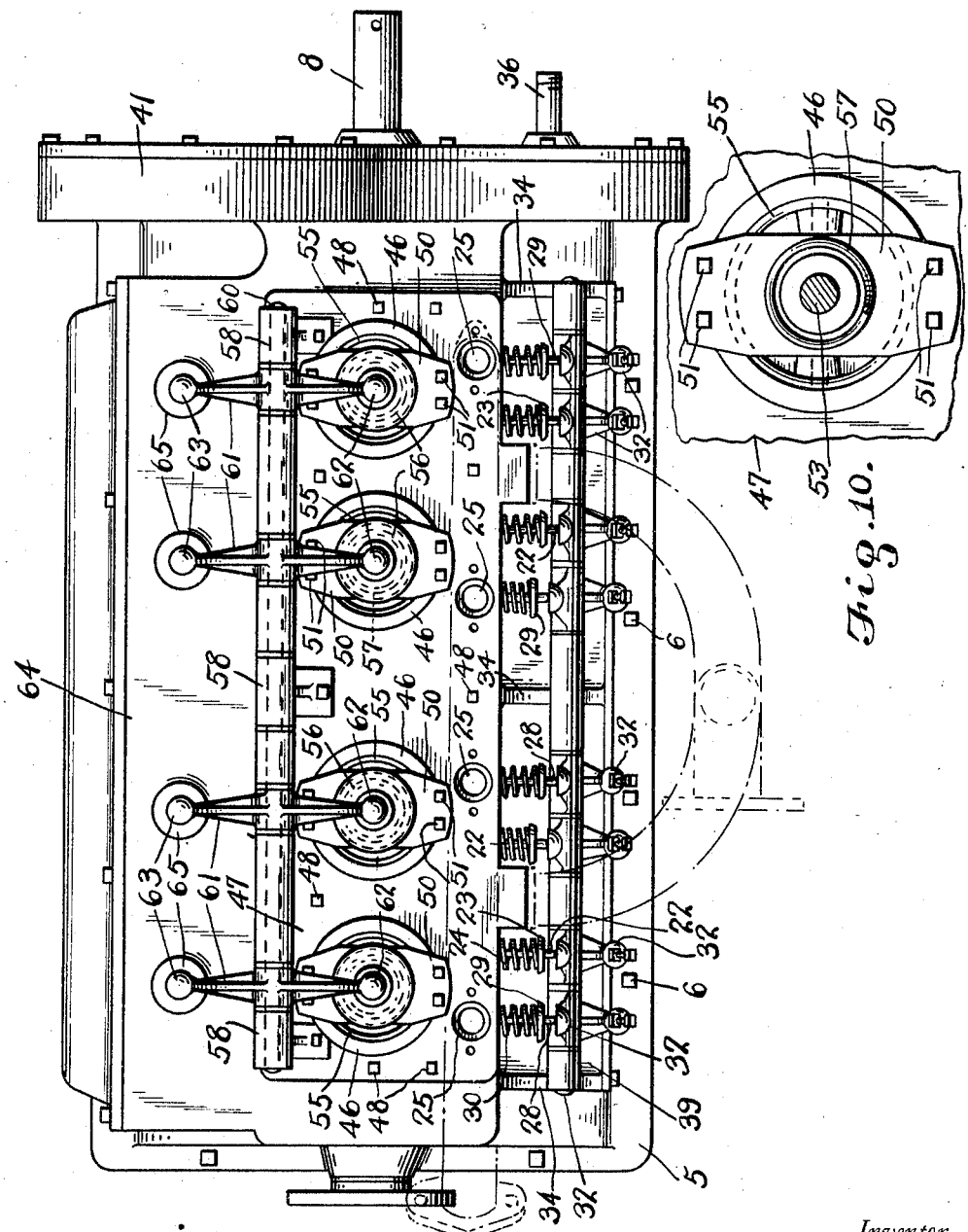

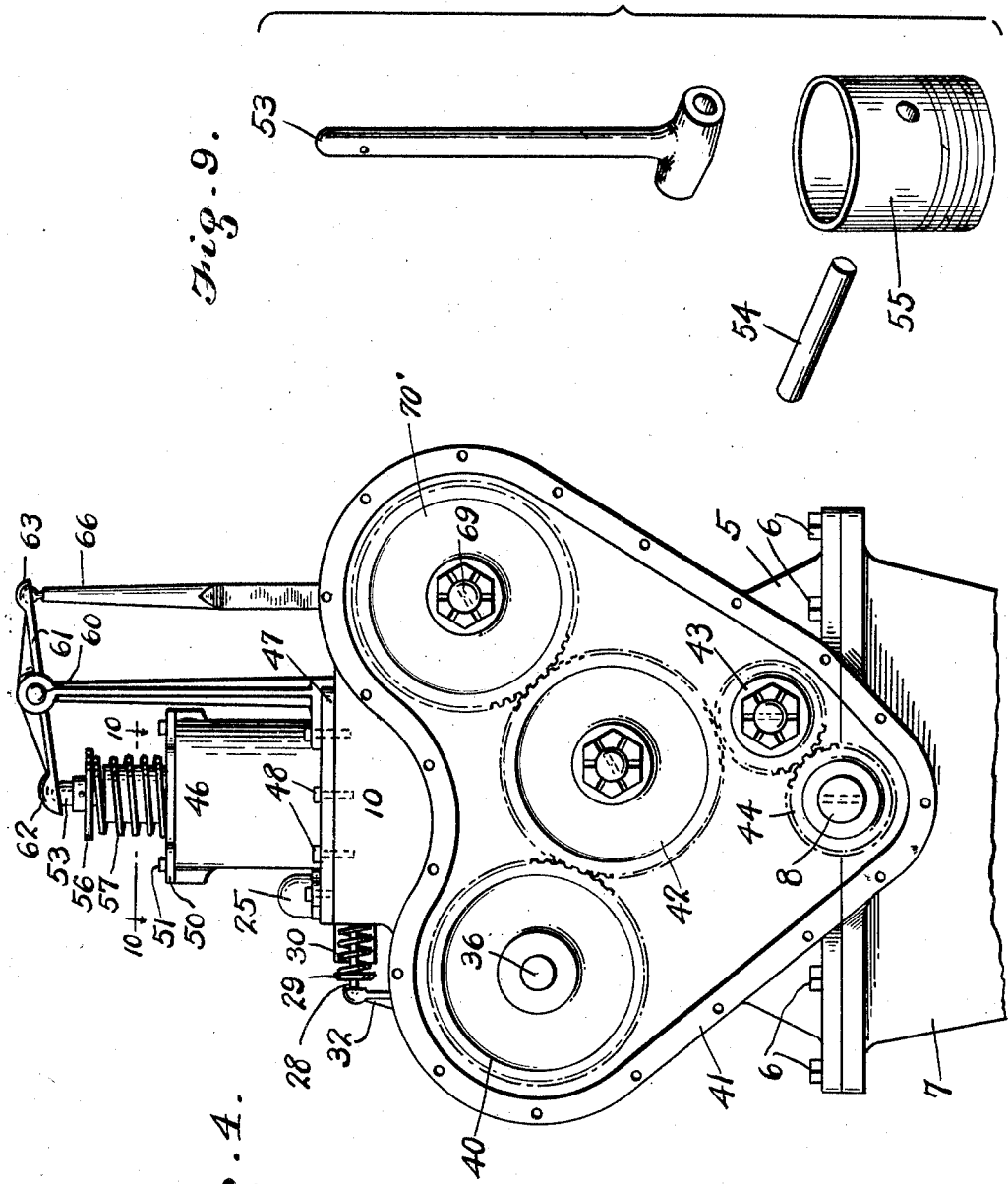

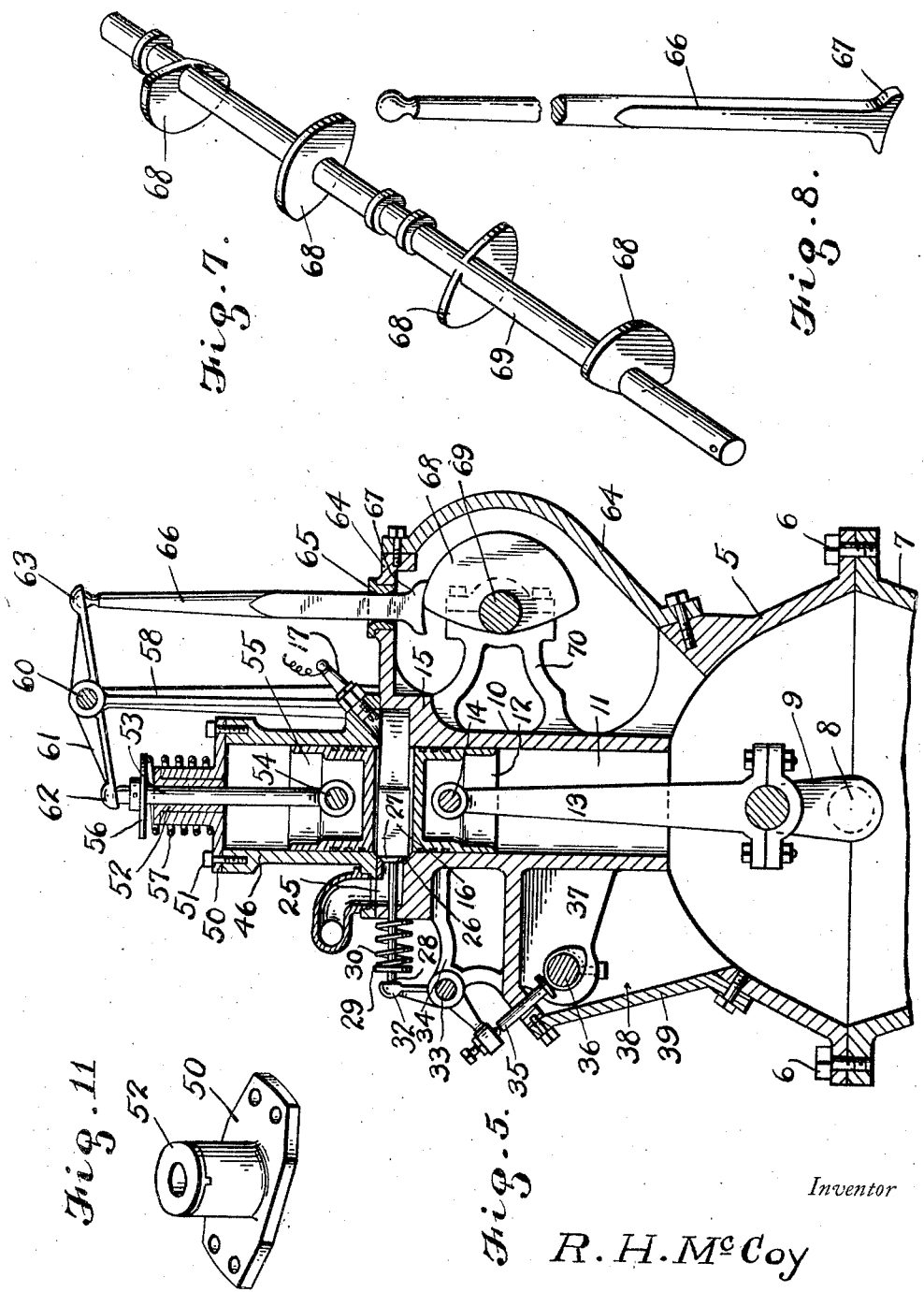

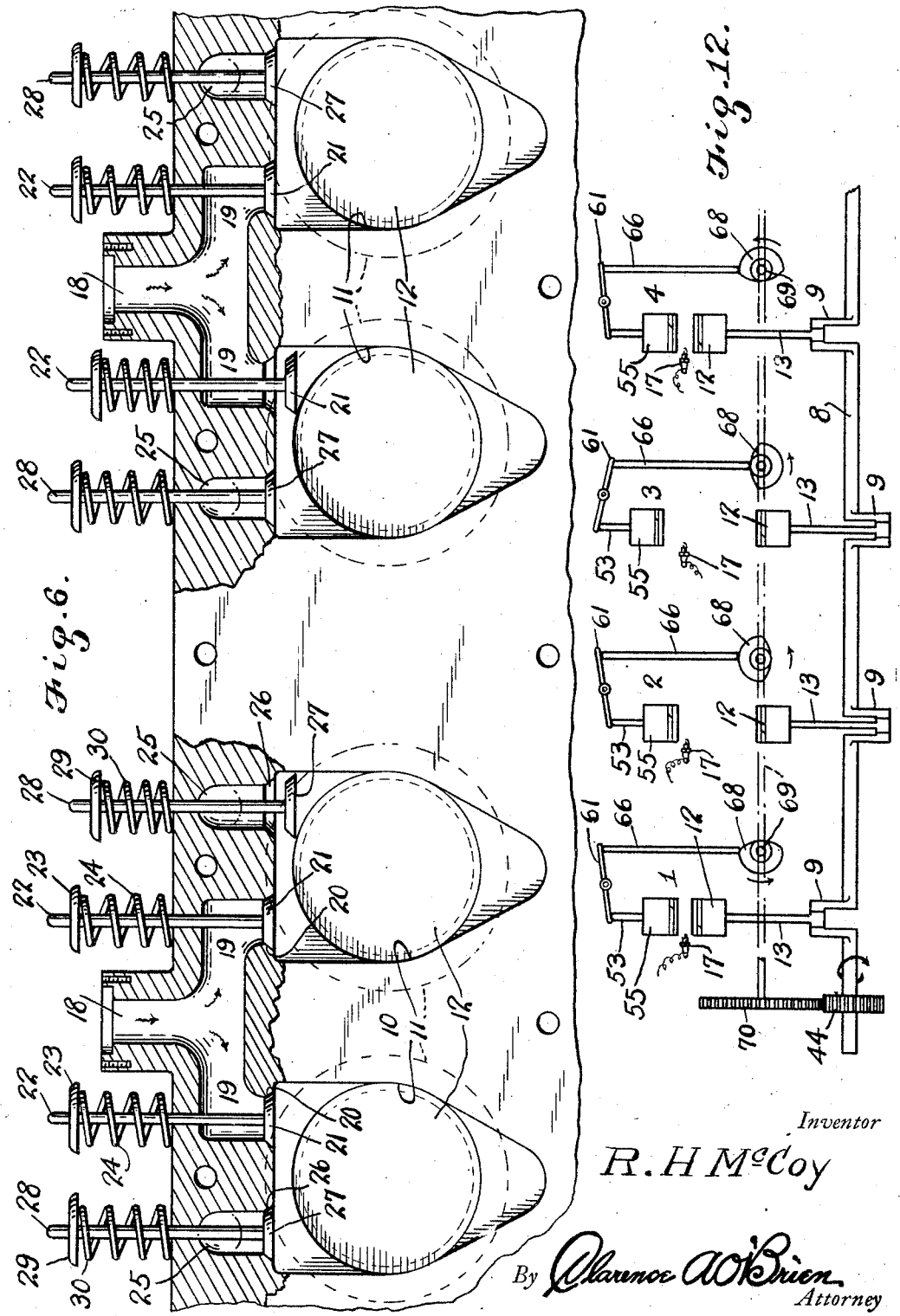

Patented July 9, 1929.

1,720,368

UNITED STATES PATENT OFFICE.

ROBERT H. McCOY, OF SALT LAKE CITY, UTAH.

INTERNAL-COMBUSTION ENGINE.

Application filed May 23, 1927. Serial No. 193,531.

The present invention relates to an internal combustion engine and has for its prime object to provide a construction which practically eliminates vibration while in operation and attains greater power with less fuel consumption than the ordinary type of internal combustion engine.

Another important feature of this internal combustion engine is that it is particularly adapted to use in aeroplanes because of its construction which affords greatly increased breathing capacity that is more air can be admitted into the combustion chamber than in other types of engines. This is an obvious advantage in rarified atmosphere.

A still further important object of the invention lies in the provision of an internal combustion engine of this nature which is comparatively simple in its construction, compact, thoroughly efficient and reliable in its operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a side elevation of the internal combustion engine embodying the features of my invention, Figure 2 is another side elevation thereof opposite to that shown in Figure 1, Figure 3 is a top plan view thereof, Figure 4 is an end elevation thereof with the cam gear housing cover removed, Figure 5 is a vertical transverse section through the engine.

Figure 6 is a horizontal longitudinal section through the engine showing the valve structure thereof, Figure 7 is a perspective view of a cam shaft, Figure 8 is a perspective view of one of the cam operated rods, Figure 9 is a perspective view of one of the auxiliary piston units, Figure 10 is an enlarged detail sectional view taken substantially on the line 10—10 of Figure 4 looking downwardly, Figure 11 is a perspective view of one of the auxiliary head boxings, Figure 12 is a diagrammatic view showing the operation of the engine.

Referring to the drawings in detail it will be seen that the numeral 5 denotes the upper section of the crank case and the numeral 7 the lower section thereof which is bolted to the upper section as at 6 or in any other suitable manner. A crank shaft 8 is journaled in the crank case between sections 5 and 7 and has a number of cranks 9. The engine illustrated herein is of the four cylinder type, but, of course, any number of cylinders may be utilized, and therefore the crank shaft 8 has four cranks 9. The numeral 10 denotes the cylinder block formed integral on the upper portion 5 of the crank case and is formed with a plurality of cylinders 11 in which are mounted pistons 12 with which are engaged connecting rods 13 through wrist pins 14. These connecting rods are connected with the cranks 9 of the crank shaft 8 in the usual well known manner. The numeral 15 denotes the cylinder head formed with firing chambers 16 one for each cylinder 11. Spark plugs 17 are engaged in the cylinder head to one side thereof. To the other side of the cylinder head is a valve structure, it being noted that numerals 18 denote the intake passages having branches 19 formed with valve seats 20 associated with which are intake valves 21 of the proper type on stems 22 with stops 23 at their outer ends and springs 24 impinge the cylinder head and the stops 23 to normally hold the intake valves closed. The numerals 25 denote exhaust passages having seats 26 with which are associated exhaust passage valves 27 on stems 28 having stops 29 thereon. Springs 30 are disposed about the stem 28 and impinge against the stops 29 and the cylinder head to normally hold the valve 27 closed against the seats 26. Rocker arms 32 are rockably mounted on a rod 33 carried by brackets 34 to one side of the cylinder block 10 and are operated by tappets 35 engageable with cams on a cam shaft 36 journaled in brackets 37 projecting laterally from the cylinder block in a casing formed on the side of the cylinder block indicated by the numeral 38 and having a removable closure 39. A gear 40 is disposed on the shaft 36 in a gear housing 41 and meshes with a gear 42 operated by a gear 43 from a gear 44 on the crank shaft 8. A plurality of cylinders 46 are mounted on a plate 47 which is bolted as at 48 or otherwise secured to the cylinder head 15 so that one of the cylinders 46 communicates with each firing chamber 16 and the cylinder 11. Cylinder heads 50 are bolted as at 51 to the upper ends of the cylinders 46 and are in the form of boxes having bushings 52 therein for slidably receiving connecting rods 53 which are connected with wrist pins 54 to auxiliary pistons 55 mounted in the cylinders 56 for rectilinear motion therein. Stop collars 56 are fixed to the outer or upper ends of the rods 53 and springs 57 are disposed about the boxing of the head 50 and impinge upwardly against the stop collars 56 for normally holding the auxiliary piston 50 in a raised position. Standards 58 rise from the plate 47 being bolted thereto as at 59 or otherwise secured thereto and have bearings at their upper ends for supporting shaft 60 on which is rockable rocker arms 61 having sockets 62 and 63 at the ends thereof, the socket 62 receiving the rounded upper end of the rods 53. A housing 64 on the side of the cylinder block 10 has openings with bushings 65 therein which are slidable cam actuated rods 66 the lower ends of which are flattened as is indicated to advantage in Figure 8 and terminate in cam actuated feet 67 for engaging cams 68 of a cam shaft 69 journaled in brackets 70 projecting from the side of the cylinder block 10 into the housing 64. A gear 70' is mounted on the shaft 69 within the gear housing 41 and meshes with the gear 42 heretofore referred to.

By referring to Figure 4 and the ratio of the gears it will be seen that the two cam shafts 36 and 69 rotate at one-half crank shaft speed. Therefore, the valves will operate as in an ordinary four cycle engine and no detailed description of the operation of these valves is needed herein. Particular attention, however, is directed to the operation and construction of the cams 68. It will be noted that these cams have a semicircular area for engaging the feet or shoes 67 of the connecting or push rods 66. Bearing this in mind and referring to the diagrammatic showing in Figure 12 it will be seen that cylinder No. 1 shows the pistons at the beginning of the intake stroke so that both of the pistons will separate to suck in a relatively large amount of firing mixture and will move to the position of cylinder No. 3 wherein the pistons are separated about to begin the compression stroke at the end of which they will be in the position as is shown in cylinder No. 4, which is about to fire. When the cylinder fires it will be noted that the upper piston remains stationary and the lower piston moves downwardly thus attaining full effect of the expansion caused by firing so that the pistons will take the position shown in cylinder 2 wherein the bottom cylinder is about to move upwardly to exhaust the gas and take the position shown in cylinder 1. Thus the four cycles may be clearly understood, the present four cylinder engine firing in the order 1, 3, 4, 2 and may be appreciated by those skilled in this art. This engine is particularly efficient in rarified atmosphere because of the moving apart of the two pistons to suck in considerable explosive fuel and to compress this fuel into a relatively small space for firing the same at which time only one piston will give.

It is thought that the construction, operation, and advantages of this invention will now be quite apparent to those skilled in this art without a more detailed description thereof. The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:—

1. In an internal combustion engine, a cylinder, a piston in the cylinder, a crank shaft operatively connected with the piston, an auxiliary cylinder alined with the first mentioned cylinder, a piston in the auxiliary cylinder, valve means for the first cylinder, and means associated with the piston of the second cylinder for causing said second piston to move away from the first piston during the intake stroke of said first piston, to move toward the first piston during the compression stroke, to remain stationary during the compression stroke, and to remain stationary during the firing and exhaust movements of the first piston, said means comprising a cam shaft having a single semicircular cam for the second piston and mounted on the cam shaft, means rotating the cam shaft at one-half the speed of the crank shaft, a push rod actuated by said semi-circular cam, a rocker actuated by said push rod, a rod connected with said second piston and actuated by said rocker, and spring means connected to said rod connected with said second piston to normally hold said second piston away from the first piston.

2. An internal combustion engine of the class described comprising a cylinder, a piston in the cylinder, a connecting rod connected with the piston, a crank shaft connected with the connecting rod, a cam shaft, valve structure associated with the cylinder, means for operating the valve structure from the cam shaft, means operatively connecting the crank shaft and cam shaft together to rotate the cam shaft at one-half crank shaft speed, a second cylinder alined with the first cylinder, a second piston slidable in the second cylinder, a second cam shaft having a single cam for the second piston, the cam on the second shaft being semi-circular, means operatively connecting the second cam shaft with the crank shaft so that said second cam shaft will operate at one-half crank shaft speed, a push rod having a shoe engageable with the semi-circular cam, a rocker, means for mounting the rocker so that one end thereof is engaged with the push rod, a rod engaged with the second piston, and a spring engaged with the second rod to hold the second piston normally away from the first piston, said rocker being engaged with the second rod.

3. An internal combustion engine of the class described comprising a cylinder, a piston in the cylinder, a connecting rod connected with the piston, a crank shaft connected with the connecting rod, a cam shaft, valve structure associated with the cylinder, means for operating the valve structure from the cam shaft, means for rotating the cam shaft at one-half crank shaft speed, a second cylinder alined with the first cylinder, a second piston slidable in the second cylinder, a second cam shaft having a single cam for the second piston, the cam on the second shaft being semi-circular, means operatively connecting the cam shaft with the crank shaft so that said cam shaft will operate at one-half crank shaft speed, a push rod having a shoe engageable with the semi-circular cam, a rocker, means for mounting the rocker so that one end thereof is engaged with the push rod, a rod engaged with the second piston, a spring engaged with the rod engaged with the second piston to hold the second piston normally away from the first piston, said rocker being engaged with the last mentioned rod, and brackets projecting from the sides of the first cylinder in which said cam shafts are journaled.

4. An internal combustion engine of the class described comprising a cylinder, a piston in the cylinder, a connecting rod connected with the piston, a crank shaft connected with the connecting rod, a cam shaft, valve structure associated with the cylinder, means for operating the valve structure from the cam shaft, means for rotating the cam shaft at one half crank shaft speed, a second cylinder alined with the first cylinder, a second piston slidable in the second cylinder, a second cam shaft having a single cam for the second piston, the cam on the second shaft being semi-circular, means operatively connecting the cam shaft with the crank shaft so that said cam shaft will operate at one-half crank shaft speed, a push rod having a shoe engageable with the semi-circular cam, a rocker, means for mounting the rocker so that one end thereof is engaged with the push rod, a rod engaged with the second piston, a spring engaged with the rod engaged with the second piston to hold the second piston normally away from the first piston, said rocker being engaged with the last mentioned rod, brackets projecting from the sides of the first cylinder in which said cam shafts are journaled, and housings disposed about said brackets and said cam shafts.

5. An internal combustion engine of the class described comprising a crank case, a crank shaft journaled in the crank case, a cylinder connected with the crank case, a piston in the cylinder, a connecting rod between the piston and the crank shaft, a valve structure to one side of the cylinder, a cam shaft, means operatively connecting the cam shaft with the valves of the valve structure to rotate the cam shaft at one half crank shaft speed, a second cylinder extending in alinement with the first cylinder and communicating therewith, a piston in the second cylinder, a cylinder head on the second cylinder having a bushing therein, a rod slidable through the bushing and connected with the second piston, a stop on the rod slidable through the bushing, a spring impinging against said stop to normally hold the second piston away from the first piston, standards, a rocker rockably mounted intermediate its ends on said standards, one end of the rocker engaging the end of the last mentioned rod, a push rod, means for slidably mounting the push rod, a second cam shaft having a single semi-circular cam thereon engageable with the push rod, and means for operatively connecting the cam shaft with the crank shaft for operating said cam shaft at one half the crank shaft speed.

6. An internal combustion engine of the class described comprising a crank case, a crank shaft journaled in the crank case, a cylinder connected with the crank case, a piston in the cylinder, a connecting rod between the piston and the crank shaft, a valve structure to one side of the cylinder, a cam shaft, means operatively connecting the cam shaft with the valves of the valve structure to rotate the cam shaft at one half crank shaft speed, a second cylinder extending in alinement with the first cylinder and communicating therewith, a piston in the second cylinder, a cylinder head on the second cylinder having a bushing therein, a rod slidable through the bushing and connected with the second piston, a stop on the rod slidable through the bushing, a spring impinging against said stop to normally hold the second piston away from the first piston, standards, a rocker rockably mounted intermediate its ends on said standards, one end of the rocker engaging the end of the last mentioned rod, a push rod, means for slidably mounting the push rod, a second cam shaft having a single semi-circular cam thereon engageable with the push rod, means for operatively connecting the cam shaft with the crank shaft for operating said cam shaft at one half the crank shaft speed, and a shoe between the push rod and the semi-circular cam.

In testimony whereof I affix my signature.

ROBERT H. McCOY.